United States Patent
Aronson et al.

(10) Patent No.: US 9,486,104 B2
(45) Date of Patent: Nov. 8, 2016

(54) MULTI-PURPOSE COFFEE MAKER POD HOLDER

(71) Applicant: B/E Aerospace, Inc., Wellington, FL (US)

(72) Inventors: William Dale Aronson, Olathe, KS (US); Lawrence Joseph Egan, Kansas City, MO (US); Kirsten Suzanne Frogley, Shawnee, KS (US)

(73) Assignee: B/E Aerospace, Inc., Wellington, FL (US)

( * ) Notice: Subject to any disclaimer, the term of this patent is extended or adjusted under 35 U.S.C. 154(b) by 306 days.

(21) Appl. No.: 14/195,476

(22) Filed: Mar. 3, 2014

(65) Prior Publication Data

US 2014/0251148 A1    Sep. 11, 2014

Related U.S. Application Data

(60) Provisional application No. 61/773,065, filed on Mar. 5, 2013.

(51) Int. Cl.
| | |
|---|---|
| *A47J 31/00* | (2006.01) |
| *A47J 31/40* | (2006.01) |
| *A47J 31/36* | (2006.01) |
| *A47J 31/06* | (2006.01) |
| A47J 31/44 | (2006.01) |

(52) U.S. Cl.
CPC ........... *A47J 31/407* (2013.01); *A47J 31/0647* (2013.01); *A47J 31/3633* (2013.01); *A47J 31/3676* (2013.01); *A47J 31/4492* (2013.01)

(58) Field of Classification Search
CPC ............. A47J 31/3623; A47J 31/3676; A47J 31/369; A47J 31/3633
USPC .................. 99/284, 295, 323, 304, 306, 307
See application file for complete search history.

(56) References Cited

U.S. PATENT DOCUMENTS

| | | | | |
|---|---|---|---|---|
| 4,149,454 | A * | 4/1979 | Kemp ................. | A47J 31/0621 210/481 |
| 4,787,299 | A | 11/1988 | Levi et al. | |
| 5,111,740 | A * | 5/1992 | Klein .................... | A47J 31/005 99/295 |
| 7,093,530 | B2 * | 8/2006 | Meister ............... | A47J 31/0647 99/295 |
| 7,540,232 | B2 * | 6/2009 | Bates ...................... | A47J 31/06 99/295 |
| 7,726,233 | B2 * | 6/2010 | Kodden ................. | A61B 1/018 99/284 |
| 7,770,512 | B2 * | 8/2010 | Albrecht ................. | A47J 31/06 426/115 |
| 2002/0129712 | A1 | 9/2002 | Westbrook et al. | |
| 2005/0076786 | A1 | 4/2005 | Meister et al. | |
| 2008/0236403 | A1* | 10/2008 | Cortese ............... | A47J 31/3685 99/323 |

OTHER PUBLICATIONS

International Search Report, Jul. 1, 2014, 4 pages.

* cited by examiner

*Primary Examiner* — Reginald L Alexander
(74) *Attorney, Agent, or Firm* — Fulwider Patton LLP

(57) ABSTRACT

A multi-purpose beverage pod holder for a beverage brewing apparatus is disclosed comprising a flange adapted to be received in a slot in the brewing apparatus, a screen disposed orthogonal with the flange for allowing fluid to pass therein through, a first cylindrical wall encircling the screen on a first surface of the pod holder, the first cylindrical wall having a first diameter and defining a first packet retainer, and a second cylindrical wall encircling the screen on an opposite surface of the pod holder, the second cylindrical wall having a second diameter that is larger than the first diameter and defining a second packet retainer. The pod holder can be used to brew both espresso and coffee in the same machine depending upon the orientation of the pod holder.

7 Claims, 3 Drawing Sheets

MULTI-PURPOSE COFFEE MAKER POD HOLDER

CROSS-REFERENCES TO RELATED APPLICATIONS

This application claims priority from U.S. Provisional Patent Application No. 61/773,065, filed Mar. 5, 2013, the contents of which is incorporated by reference in its entirety.

BACKGROUND

High capacity coffee brewing apparatus are well known in many industries, including the restaurant business, the hospitality areas of hotels, and the airline industry. These machines are typically bulky and require a source of electricity and water to brew fresh coffee. High capacity coffee brewers generate and store hot water in a reserve tank for ready use, and thus include heating equipment as well as the electronics for operating the heating coils, water temperature, and the like. For this reason, these coffee brewing machines take up a great deal of work space in a kitchen or galley.

The rise in popularity of espresso drinks had made it necessary for airlines, restaurants, and other coffee serving businesses to also include an espresso machine in the work space as well as a coffee brewing machine. Typically these two machines are placed side-by-side, and use the same supply of water and electricity, but double the amount of counter space needed. Espresso is made by a similar, but not exact, process as is used for coffee, where different pressures, temperatures, and beans are used for espresso. In kitchen areas, especially an aircraft galley, the use of two machines doubles the weight and reduces the available space by half. The present invention addresses this shortcoming.

SUMMARY OF THE INVENTION

The present invention is a brew pod holder for a high capacity coffee brewing apparatus that can be used to brew either coffee or espresso in the same brewing machine, and thus convert a coffee brewing machine to a dual coffee/espresso brewing machine. The brew pod holder includes a first basket on one side for retaining pre-packed ground coffee packets, and on the reverse side of the pod holder is a different sized basket that is used for espresso pods. The brew pod holder can be inverted in the coffee/espresso maker to allow either beverage to be brewed in the same brewing machine. The brew pod holder of the present invention can be formed with a key, tag, or some indicator that can be read (either mechanically, magnetically, or electronically) by the brewing machine to indicate the present orientation of the pod holder in the brewing machine, which in turn indicates the type of beverage that is being prepared, allowing the brewing apparatus to automatically apply the correct pressure, temperature, and brewing times for the desired beverage.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
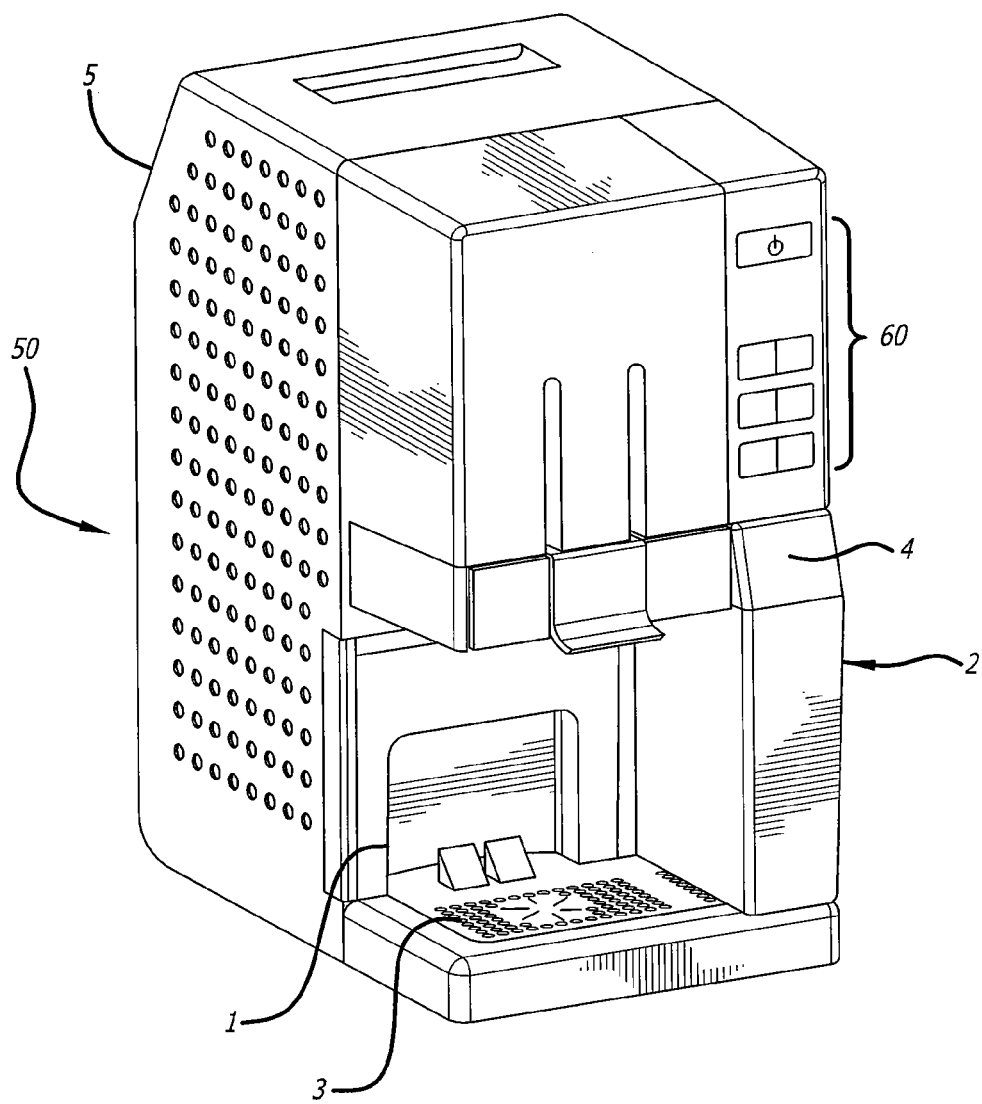
FIG. 1 is an elevated, perspective view of a beverage brewing machine of the type that uses the present invention.

FIG. 1 illustrates a coffee maker apparatus 50 of the type that can benefit from the present invention. The coffee maker 50 includes a main housing 5 and a tank assembly 1 that are used to store the electronics and the heated water, respectively, needed to brew the desired beverage. In this particular brewing apparatus, a platen 3 is situated below a port through which the brewed beverage is dispensed, where the platen 3 locates a mug, coffee cup, or coffee decanter. An optional froth maker 2 is positioned adjacent the platen 3 for adding froth or foam to a beverage such as cappuccino. The brewing apparatus 50 includes various controls such as buttons 60 for operating the machine, including a "power" button, an "espresso" button, a "coffee" button, a hot "water" button, a "Lungo" button, a "cappuccino" button, and an "extra froth" button. The multipurpose brewing apparatus 50 is able to receive the input commands via the buttons 60 and perform the requested operations using a microprocessor and logic within the housing 5. Centrally disposed within the arrangement of the brewing apparatus is a pod holder 4 for aligning the coffee packets or espresso pods under the hot water for brewing.

Figure 2A:
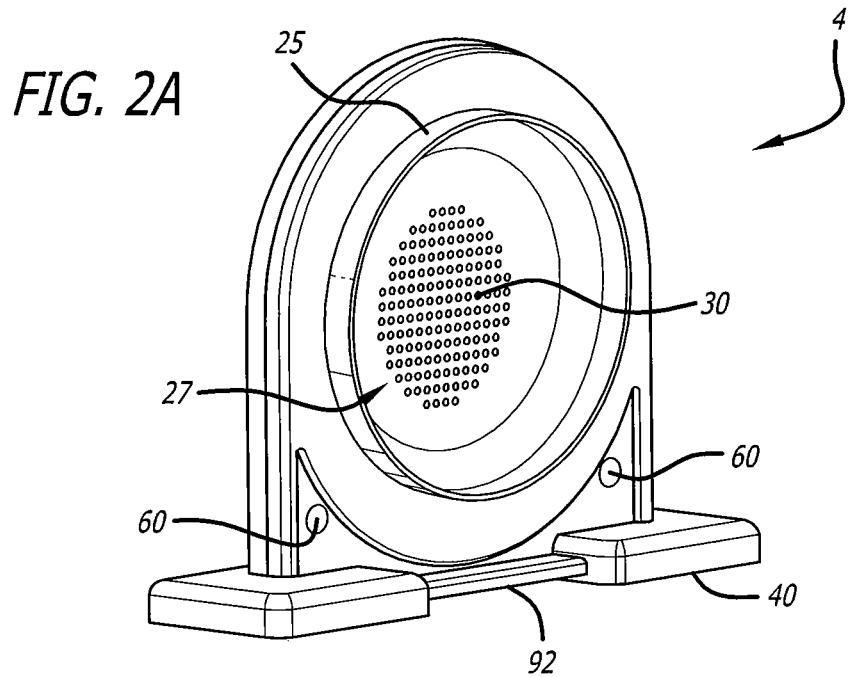
FIG. 2a is a perspective view of the coffee brewing side of the brew cup of the present invention.
Figure 2B:
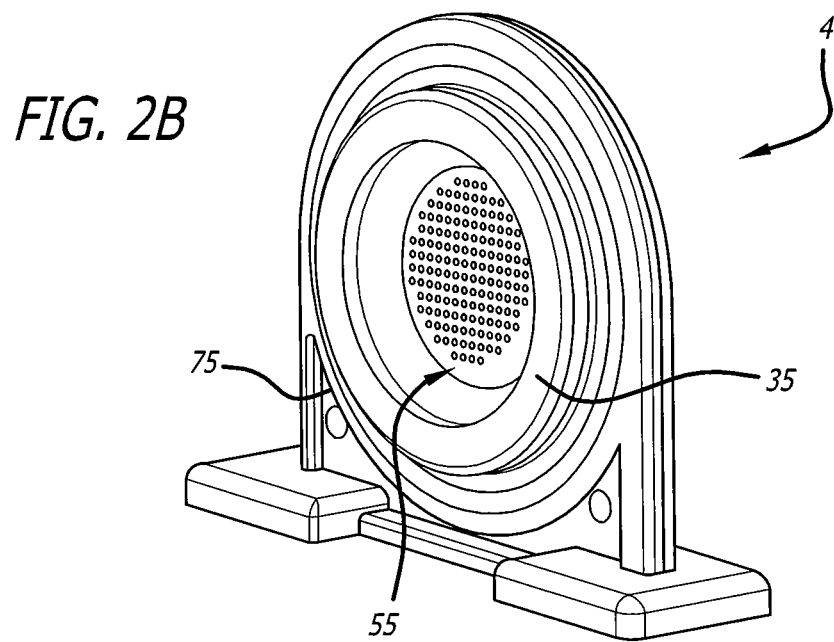
FIG. 2b is a perspective view of the espresso brewing side of the brew cup of the present invention.

FIG. 2a and FIG. 2b illustrate opposite sides of the same brew pod holder 4 of the present invention. FIG. 2a shows the pod holder 4 with a coffee brewing side exposed. An annular rim 25 defines a coffee packet retainer surrounding a brew screen 27 onto which a prepackaged coffee grounds packet is placed. The screen 27 includes a plurality of fine holes 30 through which the brewed coffee passes. The brew pod holder 4 includes a flange 40 that can be used to manually insert and extract the brew pod holder 4 from the brewing apparatus 50. FIG. 2b shows the espresso packet retainer 55 on the opposite side of the brew pod holder 4. The smaller espresso retainer 55 is formed by a thicker circular ridge 35 that is sized for smaller espresso pods. Prepackaged espresso pods fit inside of the espresso retainer 55 and drain through the same screen holes 30 as the described above with respect to the coffee. The pod holder 4 can also include visual and/or electronic indicators 60 located on the wall 75 that supports the coffee packet and espresso retainers 27,55. The indicators 60 can be pod holder orientation indicators that allow the brewing apparatus 50 to determine whether the coffee or espresso option has been selected.

Figure 3:
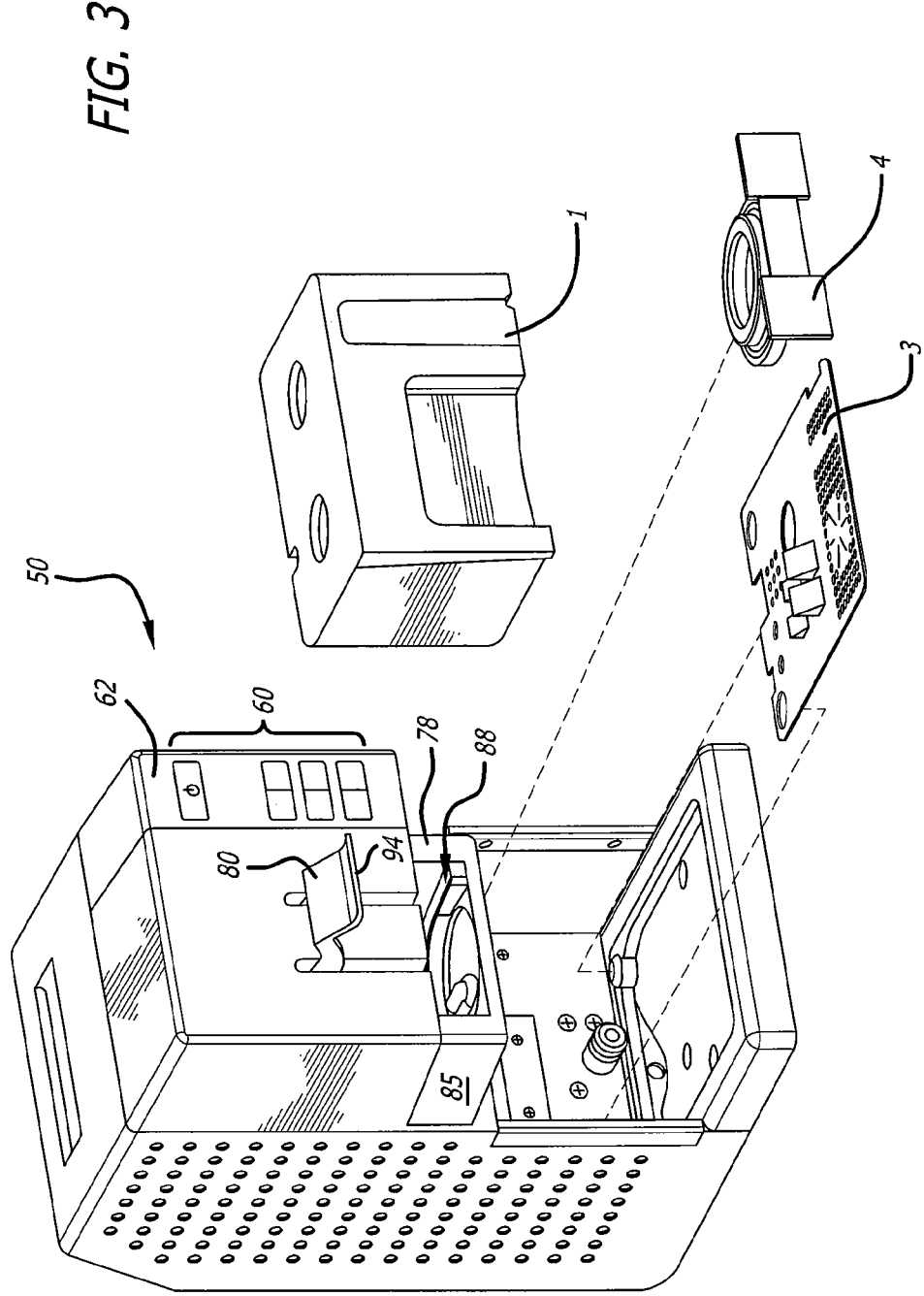
FIG. 3 is an elevated, partially exploded view of the beverage brewing machine of FIG. 1 with the brewing cup extracted.

FIG. 3 illustrates an exploded view of the brewing apparatus 50 with the brew pod holder 4 removed from its slot 88. The tank assembly 1 is disposed within the housing 5, and platen 3 is positioned below the coffee outlet to hold hot cups and allow for drainage of any spilled beverage. The brew pod holder 4 is inserted in slot 88 directly below the supply of hot water, and may be held in place by a pod securing mechanism such as a pivoting release 80 that opens and closes to lock the pod holder in place like a clamp. Once inserted, the back of the flange 40 of the brew pod holder 4 is flush against the outer wall 78 of the brew pod holder enclosure 85 so as to position the coffee grounds or espresso grounds directly beneath the hot water outlet regardless of the orientation of the brew pod holder. Depending on the orientation of the pod holder assembly 4, either espresso or coffee is be brewed by the brewing apparatus 50.

In a first preferred embodiment, the indicator 60 on the pod assembly 4 is read by the coffee brewer, either magnetically, mechanically, or electronically, so as to automatically detect the orientation of the brew pod holder assembly. For example, the poles of a magnetic can be read so as to determine whether the coffee option or espresso option is selected. The indicator can also be shaped-recognized, or have a solid surface and a void that can be determined by the brewing apparatus automatically when placed in the slot 88. Alternatively, the user can simply press the desired buttons 60 on the control panel 62, such as "coffee" or "espresso," and the machine 50 will perform the brewing operation according to that instruction. Yet another preferred embodiment, the user control panel will illuminate the permissible options based on the position of the brew pod holder 4 and the froth module 2.

In operation, the pivoting release member 80 is raised and the brew pod holder 4 is removed from the brewing apparatus 50. The flange 40 preferably includes a necked portion 92 that is adapted to receive the pivoting release member's end portion 94 to lock the pod holder 4 in place. An espresso pod having a diameter between about 44 and 45 millimeters in diameter is placed inside the espresso packet retainer 55, and the brew pod holder 4 is reinserted into the enclosure 85. The release member 80 is then closed to lock the pod holder 4 in place. A button on the control panel 62 may illuminate indicating that a cappuccino or espresso drink can be brewed in this configuration. The user may then select either the cappuccino or espresso option, which causes heated steam at the correct pressure and temperature to be forced through the espresso pod held in the pod holder 4. The brewed beverage is then collected in a decanter or a mug placed on the platen 3, which can then be served to a customer or passenger. The release member 80 is then pivoted opened and the pod holder 4 is extracted to discard the spent espresso pod, and the brewing apparatus is ready for a new cycle. To brew a coffee beverage, the procedure is repeated, except the pod holder 4 is turned over and a coffee packet is placed inside the larger coffee packet retainer 27 on the opposite side designated for coffee. The handle 80 is then closed down and the coffee light will be illuminated on the control panel 62. Once the coffee is completely brewed, release member 80 can be opened, the pod holder 4 can be extracted, and the coffee grounds can be discarded to ready the brewing apparatus for a new cycle.

It will be apparent from the foregoing that while particular forms of the invention have been illustrated and described, various modifications can be made without departing from the spirit and scope of the present invention. Accordingly, it is not intended that the invention be limited but rather all modifications and substitutions that would be recognized by one of ordinary skill in the art are intended to be included in the scope of the invention.

We claim:

1. A multi-purpose beverage pod holder for a beverage brewing apparatus, comprising:
    a flange having a planar front side including first and second members joined at a central necked element;
    a wall extending orthogonally from the flange, the wall including an indicator to signal the brewing apparatus of an orientation of the pod holder;
    a screen for allowing fluid to pass therein through;
    a first cylindrical wall encircling the screen on a first surface of the pod holder, the first cylindrical wall having a first diameter and defining a first packet retainer; and
    a second cylindrical wall encircling the screen on an opposite surface of the pod holder, the second cylindrical wall having a second diameter that is larger than the first diameter and defining a second packet retainer;
    wherein a first orientation of the pod holder indicates to the brewing apparatus a first packet retainer in use and a second orientation of the pod holder indicates to the brewing apparatus a second packet retainer in use; and
    wherein the necked element of the flange cooperates with the brewing apparatus to lock the pod holder in the brewing apparatus.

2. The multi-purpose beverage pod holder of claim 1, wherein the indicator is a magnetic indictor.

3. The multi-purpose beverage pod holder of claim 1, wherein the indicator is a shape determining indictor.

4. The multi-purpose beverage pod holder of claim 1, wherein the indicator is a contact-dependent indictor.

5. The multi-purpose beverage pod holder of claim 1, wherein a thickness of the first cylindrical wall is greater than a thickness of the second cylindrical wall.

6. The multi-purpose beverage pod holder of claim 1, wherein the wall includes first and second indicators located on opposite sides of the screen.

7. The multi-purpose beverage pod holder of claim 1, wherein the beverage pod holder is adapted to be inserted horizontally into the brewing apparatus.

* * * * *